(12) United States Patent
Barnish et al.

(10) Patent No.: US 8,375,973 B2
(45) Date of Patent: Feb. 19, 2013

(54) ONE-PIECE METAL ORIFICE TUBE AND SOLENOID VALVE INCLUDING A ONE-PIECE METAL ORIFICE TUBE

(75) Inventors: Cain Barnish, Malmesbury (GB); Mo Sanders, Bristol (GB); Paul Ellison, Bristol (GB); Gerald Scudamore, Chepstow (GB)

(73) Assignee: IMI Webber Limited, Easton, Bristol (GB)

( * ) Notice: Subject to any disclaimer, the term of this patent is extended or adjusted under 35 U.S.C. 154(b) by 420 days.

(21) Appl. No.: 12/523,187

(22) PCT Filed: Jan. 22, 2007

(86) PCT No.: PCT/EP2007/000500
§ 371 (c)(1),
(2), (4) Date: Jul. 15, 2009

(87) PCT Pub. No.: WO2008/089782
PCT Pub. Date: Jul. 31, 2008

(65) Prior Publication Data
US 2010/0108926 A1    May 6, 2010

(51) Int. Cl.
*F16K 31/02* (2006.01)
(52) U.S. Cl. ............ 137/15.18; 251/129.15; 29/890.122
(58) Field of Classification Search .............. 251/129.15; 137/15.01, 315.03, 15.18; 29/890.122
See application file for complete search history.

(56) References Cited

U.S. PATENT DOCUMENTS

| 2,279,243 | A | 4/1942 | Parsons | |
| 3,833,015 | A | 9/1974 | Kneuer | |
| 6,334,461 | B1 * | 1/2002 | Imai et al. | 251/129.15 |
| 6,427,972 | B1 * | 8/2002 | Kirschner | 251/129.15 |
| 6,637,724 | B1 * | 10/2003 | Mayer | 251/129.15 |
| 6,840,499 | B2 * | 1/2005 | Ahn | 251/129.14 |
| 2001/0050347 | A1 | 12/2001 | Otsuka et al. | |
| 2002/0029804 | A1 | 3/2002 | Liorati et al. | |
| 2002/0096465 | A1 * | 7/2002 | Fritsch et al. | 210/233 |
| 2005/0173979 | A1 | 8/2005 | Voss | |
| 2006/0017033 | A1 * | 1/2006 | Voss | 251/129.19 |

FOREIGN PATENT DOCUMENTS

| FR | 1383087 | | 12/1964 |
| FR | 2761445 | A1 | 10/1998 |
| FR | 2876159 | A | 4/2006 |
| WO | WO 2004055420 | A2 * | 7/2004 |

* cited by examiner

*Primary Examiner* — Eric Keasel
(74) *Attorney, Agent, or Firm* — The Ollila Law Group LLC

(57) ABSTRACT

A one-piece metal orifice tube (130) for use in a solenoid valve (100) is provided according to the invention. The one-piece, metal orifice tube includes a metal tube portion (131) including a proximal end (140) and a distal end (142), with the distal end being adapted to extend into an electromagnet bore (103) of an electromagnet (102) of the solenoid valve. The one-piece metal orifice tube further includes an orifice end (132) formed in the proximal end (140). The orifice end includes an orifice (133) that is smaller in diameter than a tube inside diameter D of the metal tube portion and the metal tube portion is adapted to slidably receive at least a portion of an armature (105) of a solenoid valve. In operation, the armature substantially blocks and unblocks the orifice.

15 Claims, 5 Drawing Sheets

ONE-PIECE METAL ORIFICE TUBE AND SOLENOID VALVE INCLUDING A ONE-PIECE METAL ORIFICE TUBE

BACKGROUND OF THE INVENTION

1. Field of the Invention

The present invention relates to a one-piece metal orifice tube for a solenoid valve and a solenoid valve including a one-piece metal orifice tube.

2. Statement of the Problem

A solenoid valve comprises a valve body containing a valve mechanism. The valve mechanism regulates fluid flow between one or more inlet ports and one or more outlet ports. Consequently, the valve body includes at least one orifice that is blocked or unblocked by the valve mechanism. The valve mechanism of the solenoid valve includes an electromagnet coil and an armature. The armature moves in response to the energization and deactivation of the electromagnet coil. The armature can therefore selectively contact and unblock the orifice in order to perform the valve function.

In a prior art solenoid valve, the valve can include a tube and orifice assembly that receives the armature. An orifice component can be affixed to or formed as a part of the tube. The armature can move in a reciprocating motion in the tube and orifice assembly, wherein the armature can block and unblock the orifice when it moves in a reciprocating motion.

A prior art solenoid valve can employ two separate components to make a tube and orifice assembly. The orifice portion can include cast or machined orifice portions. However, the resulting two piece tube and orifice has disadvantages, including a larger number of components, an increased number of assembly steps or processes, a more expensive component, and a potential for leakage and/or breakage at a junction of the two piece tube and orifice assembly. The prior art two piece tube and orifice often requires heavier and/or thicker materials so that the joined assembly is sufficiently robust.

Alternatively, a prior art one-piece tube can be molded from plastic. The resulting one-piece tube and orifice may not have the leakage and/or breakage potential at a joint. However, the resulting one-piece plastic orifice tube has disadvantages, including a relatively weak overall tube, an increased brittleness and softness, and a reduced temperature capability and smaller temperature range, for example. In cases where a plastic molding process is used to form both components, the wall thickness is typically much thicker than a comparable metal tube, resulting in relatively poor magnetic performance due to a larger air gap. Yet another drawback is that a molding process produces seams or mold lines that must be removed in order that a satisfactory seal can be formed against the orifice.

SUMMARY OF THE INVENTION

A one-piece metal orifice tube for use in a solenoid valve is provided according to the invention. The one-piece metal orifice tube comprises a metal tube portion including a proximal end and a distal end, with the distal end being adapted to extend into an electromagnet bore of an electromagnet of the solenoid valve. The one-piece metal orifice tube further comprises an orifice end formed in the proximal end. The orifice end includes an orifice that is smaller in diameter than a tube inside diameter D of the metal tube portion and the metal tube portion is adapted to slidably receive at least a portion of an armature of a solenoid valve. In operation, the armature substantially blocks and unblocks the orifice.

A solenoid valve including a one-piece metal orifice tube is provided according to the invention. The solenoid valve comprises an electromagnetic coil including an electromagnet bore, an armature located within the electromagnet bore and configured to move substantially reciprocally within the electromagnet bore, and a metal orifice tube located at least partially within the electromagnet bore. The orifice tube comprises a metal tube portion including a proximal end and a distal end, with the metal tube portion being configured to slidably receive at least a portion of the armature, and an orifice end in the proximal end. The orifice end includes an orifice that is smaller in diameter than a tube inside diameter D of the metal tube portion and with the metal tube portion slidably receiving at least a portion of the armature. In operation, the armature substantially blocks and unblocks the orifice A method of forming a one-piece metal orifice tube for a solenoid valve is provided according to the invention. The method comprises providing a metal tube portion including proximal and distal ends and forming an orifice end in at least one of the proximal and distal ends of the metal tube portion. The orifice end includes an orifice that is smaller in diameter than a tube inside diameter D of the tube and with the metal tube portion being adapted to slidably receive at least a portion of an armature of the solenoid valve. In operation, the armature substantially blocks and unblocks the orifice.

A method of forming a one-piece metal orifice tube for a solenoid valve is provided according to the invention. The method comprises providing a metal sheet blank and deep drawing the metal sheet blank to form a substantially tubular portion and to form an orifice end in the substantially tubular portion. The orifice end includes an orifice that is smaller in diameter than a tube inside diameter D of the tube and with the metal tube portion being adapted to slidably receive at least a portion of an armature of the solenoid valve. In operation, the armature substantially blocks and unblocks the orifice.

ASPECTS OF THE INVENTION

In one embodiment of the orifice tube, the orifice end comprises a portion of the metal tube portion that has been deformed to extend at least partially inwardly.

In another embodiment of the orifice tube, at least a portion of the orifice end curls back toward the distal end.

In yet another embodiment of the orifice tube, the orifice end includes a substantially flat, annular surface.

In yet another embodiment of the orifice tube, the orifice end is substantially rounded.

In yet another embodiment of the orifice tube, the orifice end is pressed into the orifice tube.

In yet another embodiment of the orifice tube, the orifice end is rolled into the orifice tube.

In yet another embodiment of the orifice tube, the orifice end is deep drawn into the orifice tube.

In yet another embodiment of the orifice tube, the orifice tube further comprises one or more side ports formed in the orifice tube.

In one embodiment of the solenoid valve, the orifice tube fits over the armature and extends into the electromagnet bore.

In another embodiment of the solenoid valve, the orifice end comprises a portion of the metal tube portion that has been deformed to extend at least partially inwardly.

In yet another embodiment of the solenoid valve, at least a portion of the orifice end curls back toward the distal end.

In yet another embodiment of the solenoid valve, the orifice end includes a substantially flat, annular surface.

In yet another embodiment of the solenoid valve, the orifice end is substantially rounded.

In yet another embodiment of the solenoid valve, the orifice end is pressed into the orifice tube.

In yet another embodiment of the solenoid valve, the orifice end is rolled into the orifice tube.

In yet another embodiment of the solenoid valve, the orifice end is deep drawn into the orifice tube.

In yet another embodiment of the solenoid valve, the solenoid valve further comprises an armature tip affixed to the armature, with the armature tip being formed of an at least partially compressible material.

In yet another embodiment of the solenoid valve, the solenoid valve further comprises one or more side ports formed in the orifice tube.

In one embodiment of the method, the orifice end comprises a portion of the metal tube portion that has been deformed to extend at least partially inwardly.

In another embodiment of the method, at least a portion of the orifice end curls back toward the distal end.

In yet another embodiment of the method, the orifice end includes a substantially flat, annular surface.

In yet another embodiment of the method, the orifice end is substantially rounded.

In yet another embodiment of the method, the forming comprises pressing the orifice end into the metal tube portion.

In yet another embodiment of the method, the forming comprises rolling the orifice end into the metal tube portion.

In yet another embodiment of the method, the forming comprises deep drawing the orifice end into the metal tube portion.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
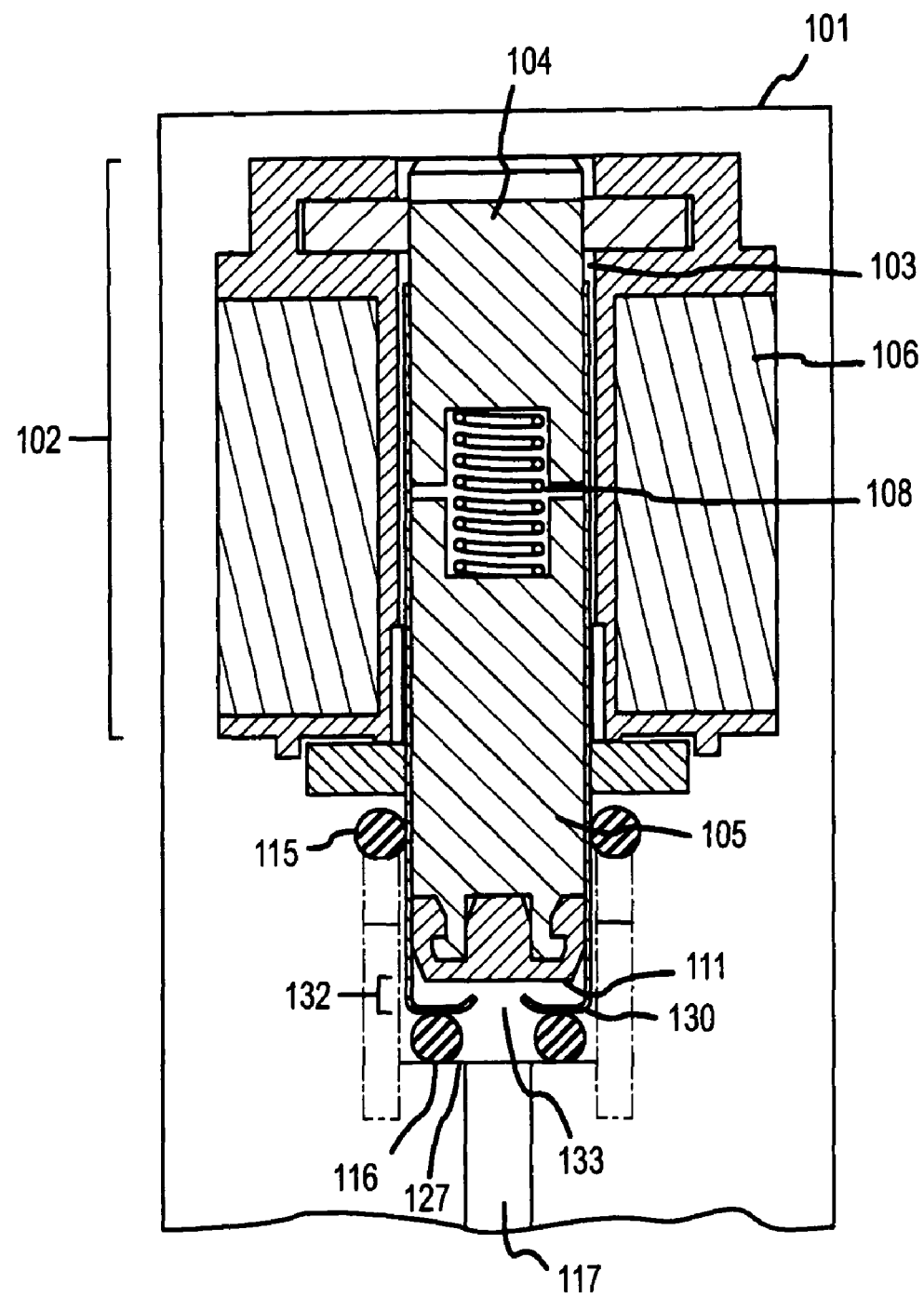
FIG. 1 is a cross-sectional view of a solenoid valve according to an embodiment of the invention.

FIG. 1 is a cross-sectional view of a solenoid valve 100 according to an embodiment of the invention. The solenoid valve 100 includes a valve body 101 and an electromagnet 102. The electromagnet 102 comprises an electromagnetic coil 106, an electromagnet bore 103 extending partially or fully through the coil 106, a substantially fixed core 104 within the electromagnet bore 103, a movable armature 105 within the electromagnet bore 103, and a biasing device 108 positioned between the core 104 and the armature 105. The core 104 can be fixed in position in the bore 103. The armature 105 can move substantially reciprocally in the electromagnet bore 103. The biasing device 108 urges the armature 105 downwardly, away from the core 104.

The solenoid valve 100 further includes a one-piece metal orifice tube 130. The one-piece metal orifice tube 130 can include a tubular portion 131 and an orifice end 132 (see FIG. 2). In some embodiments, the one-piece metal orifice tube 130 is substantially cylindrical. However, it should be understood that the one-piece metal orifice tube 130 alternatively can have other shapes, including square or rectangular cross-sectional shapes, for example. The one-piece metal orifice tube 130 includes an integral orifice 133 formed as part of the orifice end 132. The armature 105 resides and moves within the one-piece metal orifice tube 130 in some embodiments of the invention.

Figure 5:
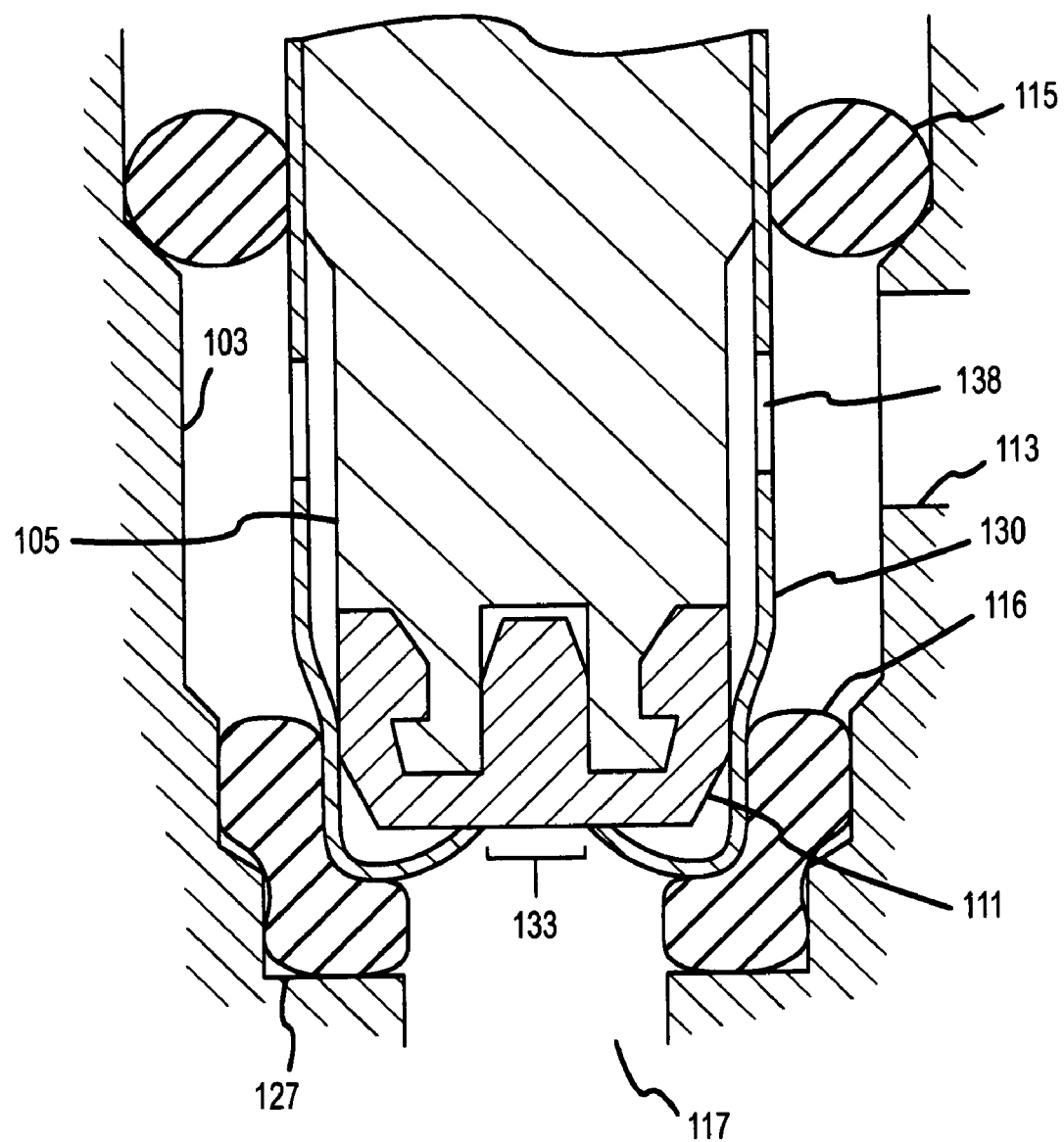
FIG. 5 shows a portion of the solenoid valve according to an embodiment of the invention.

An upper seal 115 and a lower seal 116 are located in the electromagnet bore 103 (see also FIG. 5). The upper seal can seal the orifice tube 130 to the electromagnet bore 103. The lower seal 116 is positioned between the one-piece metal orifice tube 130 and a bore end 127 of the electromagnet bore 103. At least one port 117 communicates with the electromagnet bore 103. The movement of the armature 105 can regulate passage of fluid into or out of the orifice 133 of the one-piece metal orifice tube 130. In addition, the movement of the armature 105 can regulate passage of fluid into or out of the at least one port 117.

The valve solenoid valve 100 can comprise any manner of solenoid valve. For example, the solenoid valve 100 can include two ports that are blocked and unblocked by the armature 105. Alternatively, the solenoid valve 100 may include three ports, wherein movement of the armature 105 may therefore select between two input or output ports to be communicated with the port 117.

In some embodiments, the one-piece metal orifice tube 130 can include one or more side ports 138 in the tubular portion 131 (see FIGS. 2-5). The one or more side ports 138 can be cut, punched, drawn, or otherwise formed in the orifice tube 130. Unblocking of the orifice 133 can allow fluid flow through the one or more side ports 138. Alternatively, or in addition, the armature 105 can include one or more ports or passages (not shown), wherein unblocking the orifice 133 allows such armature ports or passages to conduct fluid flow.

The armature 105 in some embodiments includes an armature tip 111. The armature tip 111 can be formed of any manner of at least partially soft or at least partially compressible material, wherein the armature tip 111 can deform at least somewhat when it contacts the orifice end 132 of the orifice tube. As a result, the armature tip 111 conforms to the orifice end 132 and forms a substantially fluid-tight seal with the orifice end 132, blocking the integral orifice 133.

When the armature is forced down into contact with the orifice 133 by the biasing device 108, then fluid flows through the port 117 may be blocked. When the coil 106 is not energized, then the biasing device 108 forces the armature 105 downward and into substantially sealing contact with the orifice 133. However, when the coil 106 is energized, the magnetic field generated by the coil 106 will pull the armature 105 upward, therefore unblocking the orifice 133. When the coil 106 is not energized, the biasing device 108 forces the armature 105 substantially fully downward and into contact with the orifice end 132 of the orifice tube 130, thereby blocking the orifice 133.

The one-piece metal orifice tube 130 can be formed in any manner. In one embodiment, the orifice end 132 is pressed into the tube portion 131 (see FIG. 2) in order to shape the orifice end 132. The pressing can form the orifice end 132 into any desired shape. The pressing in some embodiments can include rolling or crimping over the proximal end 140 of the metal tube portion 131. The forming can deform a portion of the metal tube portion 131 to extend at least partially inwardly. The forming can curl at least a portion of the orifice end 142 back toward the distal end 142.

The pressing in some embodiments can include deep drawing the one-piece metal orifice tube 130. Deep drawn metal forming is similar to metal stamping. Deep drawing comprises a forming process wherein a workpiece is drawn over a form or mold in just one step. Deep drawing is commonly performed in one pass, without successively changing forms or molds.

In some embodiments, a metal sheet blank is drawn over the form or mold. By manufacturing an orifice tube by pressing sheet metal blanks, it is possible to produce a smooth defect free edge, which is critical in a solenoid valve. Alternatively, a metal tube portion can be drawn over a form or mold.

Deep drawing does not require successive forming operations and successively sized forms or blanks. Consequently, deep drawing is popular because of its fast press cycle times. Complex axially symmetric geometries can be produced with few operations. Deep drawn metal forming is particularly economical at high volumes, where reduced processing cost significantly lowers piece-part costs. At smaller volumes, the process can be more economical than progressive die stamping due to reduced tool construction costs. From a functional standpoint, deep drawn metal forming produces high strength and light weight parts as well as geometries unattainable with some other manufacturing processes.

Figure 2:
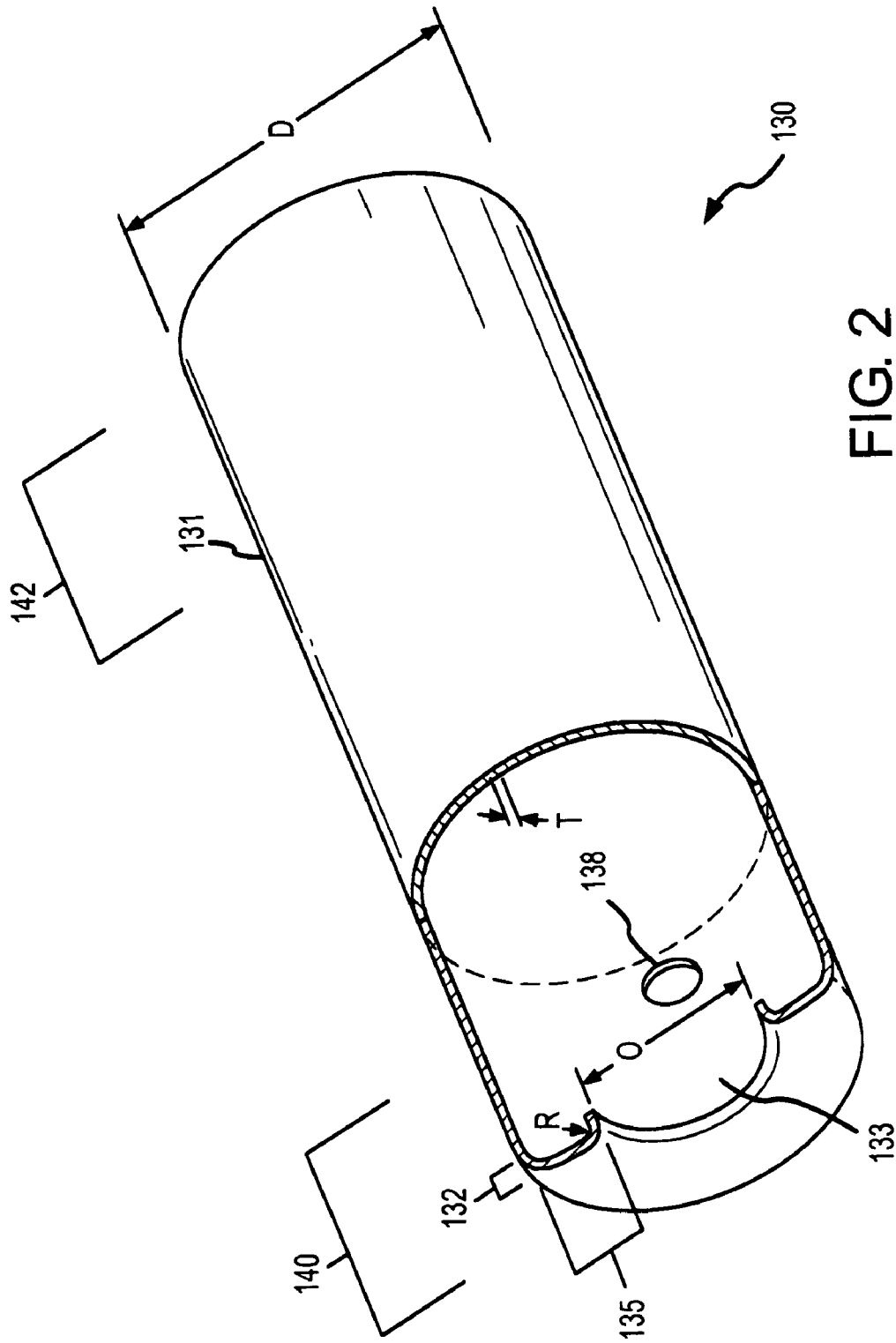
FIG. 2 shows an orifice tube according to an embodiment of the invention.

FIG. 2 shows the orifice tube 130 according to an embodiment of the invention. A portion of this figure is cut away to show detail of the orifice end 132. In this embodiment, the orifice tube 130 includes a tubular portion 131 including a proximal end 140 and a distal end 142. The orifice end 132 is formed in the proximal end of the tubular portion 131. However, it should be understood that an orifice end 132 could alternatively be formed in the distal end 142 or in both ends of the orifice tube 130, if desired.

In the embodiment shown, at least a portion of the orifice end 132 is formed to curl back toward the distal end 142. In the embodiment shown, the orifice end 132 includes the substantially flat annular surface 135. The annular surface 135 can contact and substantially fit to some manner of seal or other surface.

The tube diameter D, the tube wall thickness T, and the tube length L can be varied for different sizes of solenoid valves. The orifice detail (i.e., the orifice diameter O, edge radius R, and cross-sectional profile) can be varied to suit different flow and sealing characteristics.

Figure 3:
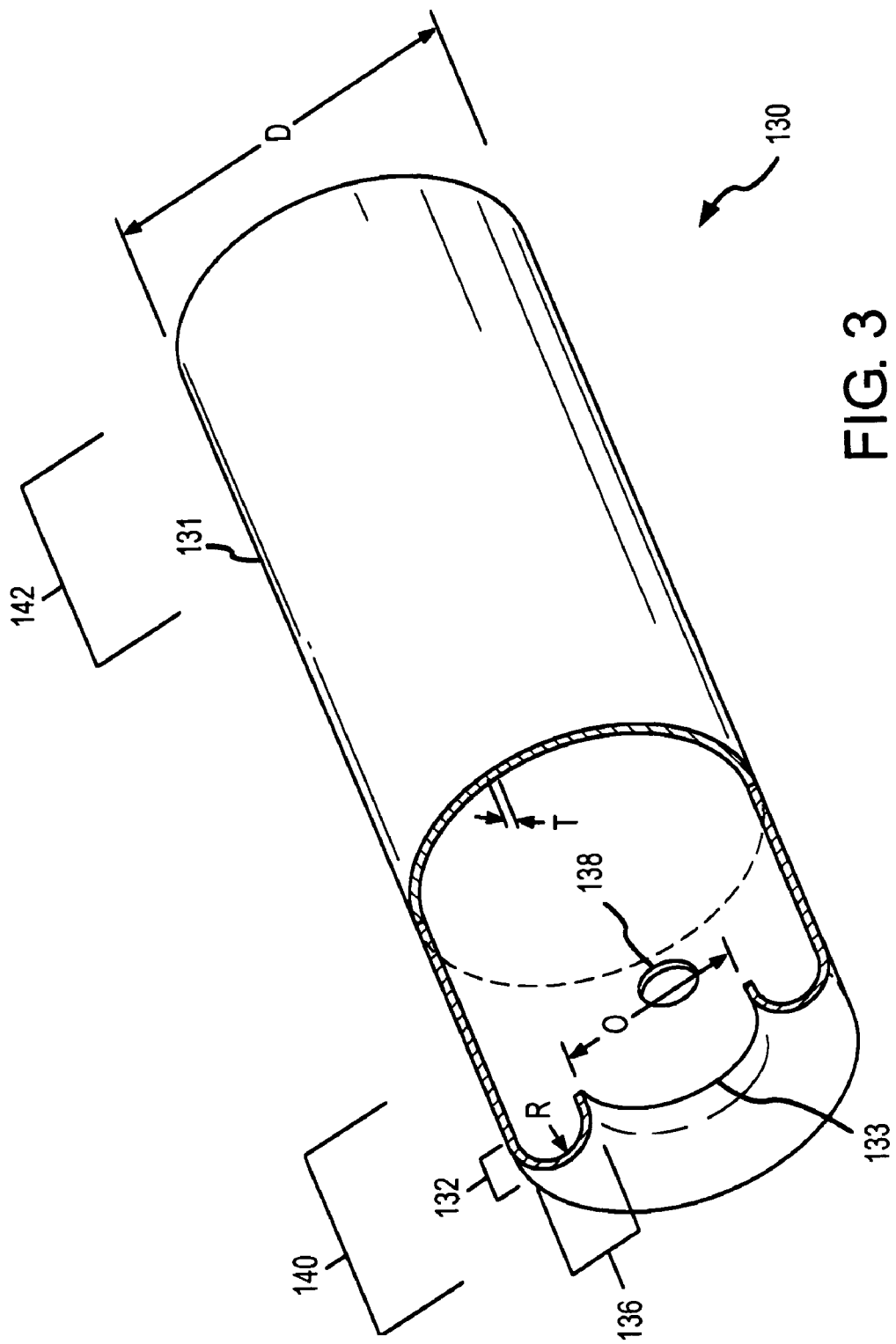
FIG. 3 shows the orifice tube according to an embodiment of the invention.

FIG. 3 shows the orifice tube 130 according to an embodiment of the invention. A portion of this figure is cut away to show detail of the orifice end 132. In this embodiment, the orifice end 132 includes a substantially rounded portion 136. The rounded portion 136 can fit to a corresponding seal or surface.

Figure 4:
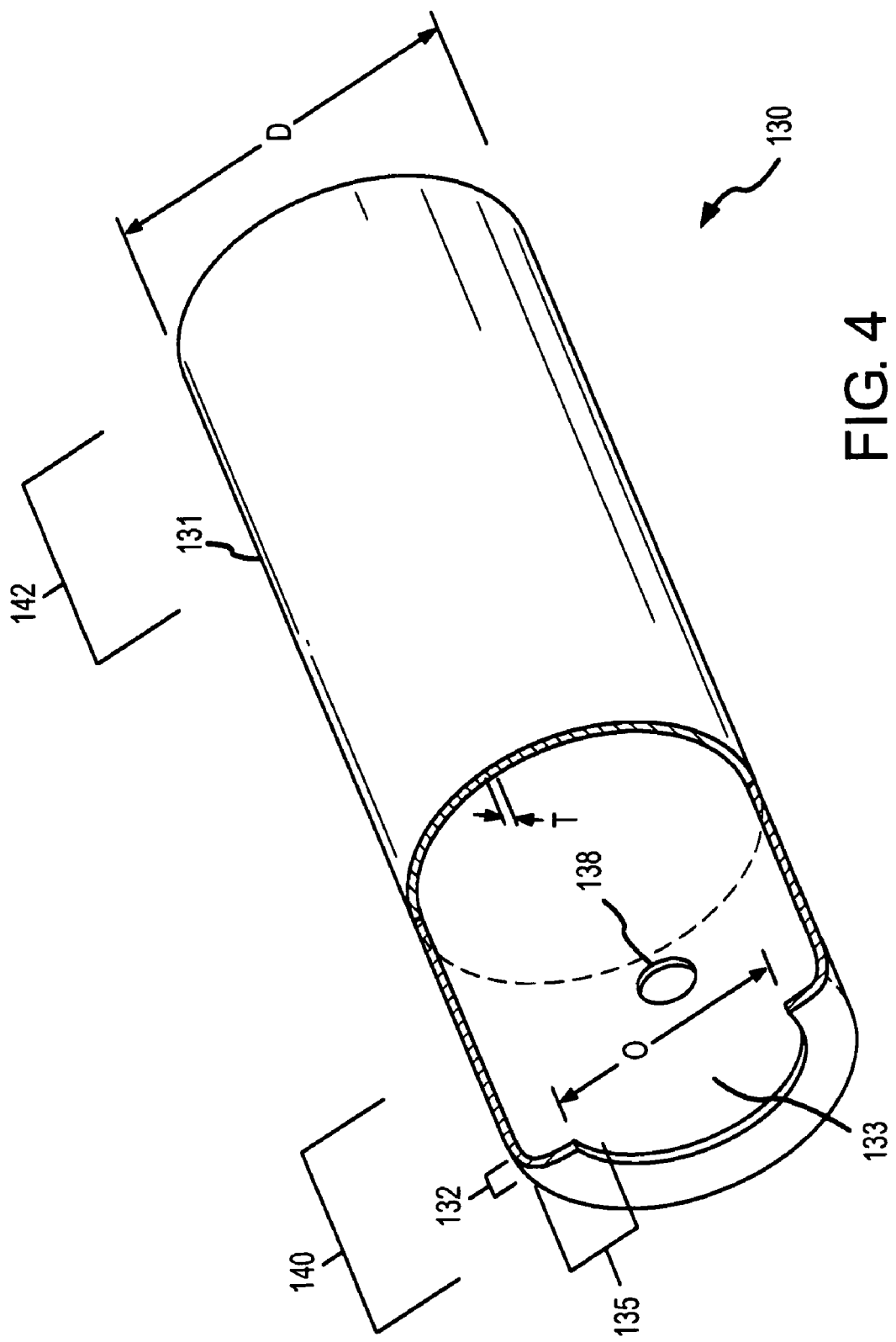
FIG. 4 shows the orifice tube according to an embodiment of the invention.

FIG. 4 shows the orifice tube 130 according to an embodiment of the invention. A portion of this figure is cut away to show detail of the orifice end 132. In this embodiment, the orifice end 132 forms a substantially flat, radially inward surface 137. The surface 137 may not appreciably curl back toward the distal end 142. The surface 137 can fit to a corresponding seal or surface.

FIG. 5 shows a portion of the solenoid valve 100 according to an embodiment of the invention. This figure shows at least one side port 138 in the orifice tube 130. Fluid passing through the side port 138 may further pass through a corresponding port 113 in the electromagnet bore 103.

The upper seal 115 seals the orifice tube 130 to the inside of the electromagnet bore 103. The lower seal 116 seals the orifice end 132 of the orifice tube 130 to the bore end 127 of the electromagnet bore 103.

This embodiment includes a necked-down orifice end 132 formed in the orifice tube 130. The necked-down orifice end 132 aids in assembling the orifice tube 130 through the seals 115 and 116. In addition, the armature 105 can also be necked-down in order to allow fluid to travel between the orifice 133 and the side orifice 138.

A prior art solenoid valve can employ two separate components to make a tube and orifice assembly. However, the resulting two piece tube and orifice has disadvantages, including a larger number of components, an increased number of assembly steps or processes, a more expensive component, and a potential for leakage and/or breakage at a junction of the two piece tube and orifice assembly. The prior art two piece tube and orifice often requires heavier and/or thicker materials so that the joined assembly is sufficiently robust.

Alternatively, a prior art one-piece tube is molded from plastic. The resulting one-piece tube and orifice may not have the leakage and/or breakage potential at a joint. However, the resulting one-piece plastic orifice tube has disadvantages, including a relatively weak overall tube, an increased brittleness and softness, and a reduced temperature capability and smaller temperature range, for example. In cases where a plastic molding process is used to form both components, the wall thickness is typically much thicker than a comparable metal tube, resulting in relatively poor magnetic performance due to a larger air gap. Yet another drawback is that a molding process produces seams or mold lines that must be removed in order that a satisfactory seal can be formed against the orifice.

The solenoid valve according to the invention can be employed according to any of the embodiments in order to provide several advantages, if desired. The one-piece metal tube and orifice can be quickly, easily, and economically formed. The one-piece metal tube and orifice can easily achieve desired manufacturing tolerances. The one-piece metal tube and orifice according to the invention requires fewer manufacturing steps than a two-piece orifice. For example, the one-piece metal tube and orifice does not require a joining or bonding procedure. Consequently, the one-piece metal tube and orifice is less likely to leak, break, or otherwise fail. In addition, the one-piece metal tube and orifice is less costly. Further, the one-piece metal tube and orifice requires less assembly time.

By manufacturing an orifice form by pressing sheet metal, it is possible to produce a smooth, defect free orifice edge and/or surface. A smooth orifice edge and/or surface is critical to proper sealing in a solenoid valve.

What is claimed is:

1. A one-piece metal orifice tube (130) adapted for use in a solenoid valve (100), with the one-piece metal orifice tube (130) comprising:
 a metal tube portion (131) including a proximal end (140) and a distal end (142), with the distal end (142) being adapted to extend into an electromagnet bore (103) of an electromagnet (102) of the solenoid valve (100);

an orifice end (132) formed in the proximal end (140), with the orifice end (132) including an orifice (133) that is smaller in diameter than a tube inside diameter D of the metal tube portion (131) and with the metal tube portion (131) being adapted to slidably receive at least a portion of an armature of a solenoid valve, wherein in operation the armature contacts an edge of the orifice (133) and substantially blocks and unblocks the orifice (133), with the orifice end (132) comprising a portion of the metal tube portion (131) that has been deformed to extend at least partially inwardly and with at least a portion of the orifice end (132) curling back toward the distal end (142) and forming a substantially rounded annular portion (136), with the substantially rounded annular portion (136) contacting and substantially fitting to a corresponding seal or surface; and one or more side ports (138) formed in the orifice tube (130), wherein retraction of the armature allows fluid flow between the orifice (133) and the one or more side ports (138).

2. The orifice tube (130) of claim 1, with the orifice end (132) being pressed into the orifice tube (130).

3. The orifice tube (130) of claim 1, with the orifice end (132) being rolled into the orifice tube (130).

4. The orifice tube (130) of claim 1, with the orifice end (132) being deep drawn into the orifice tube (130).

5. A solenoid valve (100) including a one-piece metal orifice tube (130), the solenoid valve (100) comprising:

an electromagnetic coil (106) including an electromagnet bore (103);

an armature (105) located within the electromagnet bore (103) and configured to move substantially reciprocally within the electromagnet bore (103); and the one-piece metal orifice tube (130) located at least partially within the electromagnet bore (103), with the one-piece metal orifice tube (130) comprising:
a metal tube portion (131) including a proximal end (140) and a distal end (142), with the metal tube portion (131) being configured to slidably receive at least a portion of the armature (105);
an orifice end (132) in the proximal end (140), with the orifice end (132) including an orifice (133) that is smaller in diameter than a tube inside diameter D of the metal tube portion (131) and with the metal tube portion (131) slidably receiving at least a portion of the armature (105), wherein in operation the armature (105) contacts an edge of the orifice (133) and substantially blocks and unblocks the orifice (133), with the orifice end (132) comprising a portion of the metal tube portion (131) that has been deformed to extend at least partially inwardly and with at least a portion of the orifice end (132) curling back toward the distal end (142) and forming a substantially rounded annular portion (136), with the substantially rounded annular portion (136) contacting and substantially fitting to a corresponding seal or surface; and
one or more side ports (138) formed in the orifice tube (130), wherein retraction of the armature allows fluid flow between the orifice (133) and the one or more side ports (138).

6. The solenoid valve (100) of claim 5, wherein the orifice tube (130) fits over the armature (105) and extends into the electromagnet bore (103).

7. The solenoid valve (100) of claim 5, with the orifice end (132) being pressed into the orifice tube (130).

8. The solenoid valve (100) of claim 5, with the orifice end (132) being rolled into the orifice tube (130).

9. The solenoid valve (100) of claim 5, with the orifice end (132) being deep drawn into the orifice tube (130).

10. The solenoid valve (100) of claim 5, further comprising an armature tip (111) affixed to the armature (105), with the armature tip (111) being formed of an at least partially compressible material.

11. A method of forming a one-piece metal orifice tube for a solenoid valve, the method comprising:
providing a metal tube portion including proximal and distal ends;
forming an orifice end in at least one of the proximal and distal ends of the metal tube portion, with the orifice end including an orifice that is smaller in diameter than a tube inside diameter D of the tube and with the metal tube portion being adapted to slidably receive at least a portion of an armature of the solenoid valve, wherein in operation the armature contacts an edge of the orifice and substantially blocks and unblocks the orifice, with the orifice end comprising a portion of the metal tube portion that has been deformed to extend at least partially inwardly and with at least a portion of the orifice end curling back toward the distal end and forming a substantially rounded annular portion, with the substantially rounded annular portion to contacting and substantially fitting to a corresponding seal or surface; and
forming one or more side ports in the orifice tube, wherein retraction of the armature allows fluid flow between the orifice and the one or more side ports.

12. The method of claim 11, with the forming comprising pressing the orifice end into the metal tube portion.

13. The method of claim 11, with the forming comprising rolling the orifice end into the metal tube portion.

14. The method of claim 11, with the forming comprising deep drawing the orifice end into the metal tube portion.

15. A method of forming a one-piece metal orifice tube for a solenoid valve, the method comprising:
providing a metal sheet blank;
deep drawing the metal sheet blank to form a substantially tubular portion and to form an orifice end in the substantially tubular portion, with the orifice end including an orifice that is smaller in diameter than a tube inside diameter D of the tube and with the metal tube portion being adapted to slidably receive at least a portion of an armature of the solenoid valve, wherein in operation the armature contacts an edge of the orifice and substantially blocks and unblocks the orifice, with the orifice end comprising a portion of the metal tube portion that has been deformed to extend at least partially inwardly and with at least a portion of the orifice end curling back toward the distal end and forming a substantially rounded annular portion, with the substantially rounded annular portion contacting and substantially fitting to a corresponding seal or surface; and
forming one or more side ports in the orifice tube, wherein retraction of the armature allows fluid flow between the orifice and the one or more side ports.

* * * * *